US005733842A

United States Patent [19]
Gerdes et al.

[11] Patent Number: 5,733,842
[45] Date of Patent: Mar. 31, 1998

[54] METHOD OF MAKING POROUS CATALYST CARRIER WITHOUT THE ADDITION OF PORE FORMING AGENTS

[75] Inventors: William H. Gerdes, Hudson; Donald J. Remus, Stow; Thomas Szymanski, Hudson, all of Ohio

[73] Assignee: Norton Checmical Process Products Corporation, Stow, Ohio

[21] Appl. No.: 795,168

[22] Filed: Feb. 10, 1997

Related U.S. Application Data

[63] Continuation-in-part of Ser. No. 664,935, Apr. 30, 1996.

[51] Int. Cl.$^6$ ............................................ B01J 21/04
[52] U.S. Cl. ..................... 502/439; 502/407; 502/414; 502/145; 502/355; 502/133; 502/125; 502/153; 264/681
[58] Field of Search ................ 502/407, 414, 502/439, 145, 355; 501/133, 125, 153; 264/681

[56] References Cited

U.S. PATENT DOCUMENTS

| | | | |
|---|---|---|---|
| 4,968,660 | 11/1990 | Tiburg et al. | 502/303 |
| 5,055,442 | 10/1991 | Osaka et al. | 502/439 |
| 5,100,859 | 3/1992 | Gerdes et al. | 502/439 |
| 5,145,824 | 9/1992 | Buffum et al. | 502/216 |
| 5,266,548 | 11/1993 | Koradia et al. | 502/439 |
| 5,380,697 | 1/1995 | Matusz et al. | 502/348 |
| 5,384,302 | 1/1995 | Gerdes et al. | 502/439 |

*Primary Examiner*—Glenn A. Caldarola
*Assistant Examiner*—Nadine Preisch
*Attorney, Agent, or Firm*—David Bennett

[57] ABSTRACT

An improved catalyst carrier is formed by a process that comprises the use of ceramic particle components with particle sizes chosen to ensure that a desired degree of porosity is obtained without recourse to the use of organic burnout materials.

12 Claims, No Drawings

METHOD OF MAKING POROUS CATALYST CARRIER WITHOUT THE ADDITION OF PORE FORMING AGENTS

This application is a continuation-in-part of copending application Ser. No. 08/664,935 filed on Apr. 30, 1996.

This invention relates to catalyst carriers and specifically to alpha alumina-based catalyst carriers useful in conjunction with catalysts such as silver-containing catalysts used in the preparation of ethylene oxide.

BACKGROUND OF THE INVENTION

The use of porous ceramic catalyst carriers has previously been described in a number of patents including U.S. Pat. Nos. 5,384,302; 5,100,859; 5,055,442; 5,037,794; and 4,874,739. Such carriers have a wide variety of potential applications in the catalytic field and are especially useful where the ceramic base is an alumina such as alpha alumina. A catalyst support needs to possess, in combination, at least a minimum surface area on which the catalytic component may be deposited, high water absorption and crush strength. The problem is that usually an increase in one can mean a reduction in another property. Thus high crush strength may mean low porosity. Often the balance is achieved by trial and error making the catalyst carrier art even more unpredictable than other chemical process art.

Carriers need to have a uniform degree of porosity and this may be achieved in a number of ways including the incorporation of burnout materials that are eliminated when the ceramic is fired to form the finished product. Typical burnout materials include charcoal, petroleum coke, ground walnut shells and the like. The problem is that such materials usually leave leachable residues that can significantly impair the performance of catalysts supported on carriers made using such burnout materials. Furthermore the actual content of such leachable material varies widely from batch to batch so that predictability is unsatisfactory. In an attempt to circumvent this problem, it has been proposed to incorporate organic polymeric burnout materials with very low metallic leachables content,(U.S. patent application Ser. No. 08/381, 808, filed Feb. 1, 1995). Such burnout materials however still leave result-affecting traces of residue.

A way has now been found to design carriers with more confidence as to the final property balance. The carriers of the invention have an excellent balance of crush strength, abrasion resistance, porosity and catalytic performance that make them ideal for a wide range of catalytic applications. Most importantly however the amount of metallic leachables has been significantly reduced without parallel negative effects on the physical properties. Indeed the resultant carrier can be used with known catalytic components to produce a catalyst with greater selectivity and/or activity stability than is available with prior art catalysts of the same type.

GENERAL DESCRIPTION OF THE INVENTION

The present invention provides a novel process for the production of an alpha alumina-based catalyst carrier which does not require the presence of pore-inducing burnout materials. The process provides a carrier that has no metallic oxide leachables present as a result of the burnout of the pore formers. Some leachables, and particularly some metallic leachables, are known to adversely affect the stability of the selectivity and/or the activity of a catalyst deposited on the carrier in that, using prior art catalysts on carriers with conventional amounts of metallic leachables, these parameters decline over time. Since the amount of leachables in organic burnout materials is subject to considerable variability, the impact on the performance from batch to batch likewise varies. Thus predictability in performance is significantly and adversely impacted by the leachables. Leachables may arise from several sources but by eliminating one very significant source, the organic burnout material, the variability of performance impact is reduced. Moreover while with the carriers of the present invention there is still a decline in selectivity over time, the rate of such decline is greatly reduced making the catalysts prepared using such carriers able to perform at acceptable levels for significantly longer periods.

"Metallic leachables" as the term is to be understood in the context of this Application refers to the total amount of the elements sodium, potassium, calcium and aluminum present in the carrier measured in parts by weight per million. It is calculated by boiling a standard amount of the finished carrier in a standard volume of 10% nitric acid for 30 minutes. This extracts the metals in the form of the soluble nitrates which may then be analyzed for the residual metallic values.

The invention provides a process for the production of a catalyst carrier which comprises providing a mixture of ceramic components comprising at least 80% by weight of alpha alumina particles, 0.01 to about 10% by weight of an alkaline earth metal oxide selected from calcium and magnesium oxides, 0.01 to about 10%, (measured as silica), of a silicon oxide and from zero to about 15% by weight, measured as the dioxide) of zirconia, (all proportions being measured on the basis of the weight of the finished carrier), a liquid carrier medium and optionally a ceramic bond, a lubricant and/or extrusion aids; shaping the mixture to form a carrier precursor; drying the carrier precursor to remove the liquid carrier medium; and then firing the precursor to form an alpha alumina carrier with a porosity that is preferably from about 15 to about 60%, wherein the sizes of the alpha alumina particles are chosen such that the porosity of the dried precursor, after making allowance for the presence of the lubricant and extrusion aids, is not less than the porosity of the fired carrier.

The above process introduces porosity in the form of the natural porosity that results when large particles are sintered together, modified by the presence of smaller particles that fill up some of the spaces between the larger particles until exactly the desired degree of porosity is achieved. This is in contrast to the prior art approach of forming porosity by inclusion of material subsequently burned out. As a result of the absence of the conventional burnout material, the process of the invention can also be characterized in that the loss of weight upon firing the dried extrudate is less than about 15%, which is the maximum amount of residual liquid carrier medium, (with water this is usually about 2% by weight), lubricants and extrusion aids that might conventionally be used to produce such carriers.

Because there are essentially no burnout pore formers present, (though some small amounts, for example up to about 5% of the weight of the ceramic components, may be added to assist in pore forming without departing from the essence of the invention), the dried precursor of the carrier usually has a porosity that is at least 95% of that of the finished carrier, after making allowance for the presence of lubricants and extrusion aids. Some slight reduction of the porosity will be expected to occur upon firing as a result of the sintering together of the ceramic particles. There will however be no significant increase in porosity such as results when a burnout material is volatilized from the precursor.

Another indicator of the products made by the process of the invention is that the packing density, (measured by ASTM 4699-87, modified by the use of a cylinder with an inside diameter of 3¾ inches and a length of 18 inches, or the equivalent), is frequently less than about 10% greater for the green, unfired carrier than for the fired carrier. Indeed typically the density of the fired carrier is if anything slightly higher than that of the unfired carrier. A typical carrier made with organic burnout materials conventionally comprises 20 to 35% by weight, based on the weight of the ceramic components, of material that is removed during firing and of this amount from 50 to about 75% is provided by the burnout materials. Thus the green packing density is typically from about 8 to 15% greater than the density of the corresponding fired carrier materials for conventionally formed carriers. By contrast the difference in green packing density and fired density for the products of the invention is very small and usually the green pack density is up to about 2% greater than the unfired density. After making allowance for the presence of lubricants and extrusion aids in the unfired material the density difference is insignificant.

Manipulation of the porosity can be achieved according to the invention in a number of ways. For example it is possible to use relatively large particles of a first alumina component such as particles from about 15 to about 120 microns in average particle size and then add relatively small alumina particles with average particle sizes of from about 1 to about 15 microns. The proportions in which the components appear is dictated by the final desired porosity and the desired average pore size.

When a bimodal particle size distribution is chosen the larger particle size component can be supplied by monolithic particles or alternatively, and sometimes preferably, they may be supplied in the form of lightly sintered alpha alumina agglomerates. This is often the form of commercial alpha alumina components which can relatively easily be comminuted to a uniform fine particle size by a conventional milling operation. The intensity of the milling required will depend largely on the degree of sintering that accompanied the conversion to the alpha phase. By initiating the process with agglomerated alumina components and then subjecting the agglomerates to a milling operation sufficient to generate exactly the correct amount of the finer particles, a blend of particle sizes can be generated with exactly the desired porosity in the final carrier. With lightly sintered alumina agglomerates this milling operation can be supplied by the normal mixing and extruding operations involved in producing the carrier material and this is often a preferred way of operating especially where the unmilled agglomerated product has properties that are reasonably consistent from batch to batch. Therefore in a preferred manner of operating the alumina is provided in the form of unmilled agglomerated particles having a median agglomerated particle size of from about 15 to 120, more preferably from 30 to 90, and most preferably from about 40 to about 80 microns with the particles formed upon comminution having median particle sizes of from about 1 to about 6, and preferably about 1.5 to 4 microns.

It is often preferred to use mixtures of ground alumina agglomerates with known particle size distribution and unground alpha alumina agglomerates and to ensure that the production process includes no operations that could result in unacceptable reduction in the average particle size of the agglomerate components.

The particles can have any desired configuration but since the objective is to produce a carrier material with a high but uniform porosity, this is most efficiently achieved if the larger particles have a generally blocky, (that is more nearly spherical), configuration. In the same way the smaller particles are also preferably somewhat blocky in shape.

The material from which the carrier is made is based predominantly on alpha alumina, with at least 80% and preferably 85 or even 90% or more of the weight of the finished carrier being provided by alpha alumina. However minor amounts of other ceramic oxides such as zirconia, titania, silica and/or alkaline earth metal oxides, (calcia, magnesia and strontia), may be present. The alpha alumina is present in the calcined carrier in an amount greater than about 80%, preferably 85%, and more preferably 95% by weight of the total carrier.

The calcium or magnesium oxide component of the carrier composition of the invention this can be present in an amount that represents from 0.01 to about 10% by weight (measured as the oxide, MO,) of the carrier weight but preferably the amount present is from about 0.03 to about 5.0% and especially from about 0.05 to about 2.0% by weight.

The calcium and magnesium compounds that may be used to prepare the carriers of the invention are oxides or compounds that are decomposable to or which form oxides upon calcination. Examples include carbonates, nitrates, and carboxylates. Other suitable compounds include the oxides themselves, and mixed oxides such as the aluminates, silicates, aluminosilicates, zirconates and the like. The preferred compounds are calcium oxide and calcium silicate.

The silicon compounds used to prepare the carriers of the invention are oxides or compounds decomposable to the oxides upon calcination. Suitable compounds include silicon dioxide itself, as well as the mixed oxides such as the alkaline earth metal silicates, zirconium silicates, aluminosilicates such as zeolites, hydrolyzable silicon compounds, polysiloxanes and the like. The amount used should be such as to provide, in the final carrier composition, from about 0.01 to about 15.0%, such as from about 0.03 to about 10.0% and most conveniently from about 0.05 to about 5.0% by weight, (measured as silica).

The zirconia component, while optional, is preferably present in an amount that is from about 0.01 to about 10.0%, such as from about 0.3 to about 5.0% and especially from about 0.05 to about 2.0% by weight based on the carrier weight. Where the zirconia is generated in situ, the amount used should be selected to give a final proportion within these parameters.

The zirconium compounds which may be used to prepare the carriers are oxides or compounds which are decomposable to or which form oxides upon calcination. Examples include carbonates, nitrates and carboxylates. Suitable compounds include zirconium nitrate, zirconium dioxide, as well as the mixed oxides such as zirconium silicates, zirconium aluminosilicates, zirconates and the like. The preferred compound is zirconium dioxide.

The alpha alumina component is most preferably combined with calcium or magnesium silicate itself but, as indicated above, it is also possible to use a calcium or magnesium oxide-generating compound and silica or a silica-generating compound in such proportions that on heating calcium silicate is produced. These components are mixed with zirconia or a zirconia-generating compound, (where present), a ceramic bond material, lubricants and/or extrusion aids and water, formed into shapes and calcined.

The formulation from which the carriers of the invention is formed can also comprise a "binding agent" and this term, as used herein, refers to an agent that holds together the various components of the carrier prior to calcination to form an extrudable paste, i.e. the so-called low temperature binding agent. The binding agent also facilitates the extrusion process by adding lubricity. Typical binding agents include alumina gels, particularly in combination with a peptizing agent such as nitric or acetic acid. Also suitable are the carbon based materials, including celluloses and substituted celluloses such as methylcellulose, ethylcellulose and carboxyethylcellulose, stearates such as organic stearate esters, e.g. methyl or ethyl stearate, waxes, polyolefin oxides and the like. Preferred binding agents are petroleum jelly and polyolefin oxides.

The use of calcium or magnesium silicate, whether prepared directly or formed in situ with the constraints described above, can completely replace the need for a ceramic bond component. Even where it is considered necessary to use a ceramic bond component it is often possible to use ceramic bonds containing, overall, a lower amount of silica then is present in conventional bonds. It also permits the avoidance of an excess of silicon dioxide which typically contains deleterious amounts of sodium, iron and/or potassium impurities, especially when present in clays, bentonite and the like. As is known, the avoidance of such metallic impurities is a highly desirable objective.

The role of the zirconia, where used, is not fully understood but it appears to stabilize certain partial oxidation catalyst recipes. Calcium silicate appears to stabilize at least a proportion of the zirconia in the more active tetragonal form instead of the monoclinic form to which the mixed phase reverts when heated in the absence of calcium silicate.

The catalyst carrier of the invention may comprise a number of other ceramic-forming components chosen to contribute to the desired physical properties, including crush strength and the like. For example components such as titania in an amount of up to about 5% by weight, are often found to confer particular advantage on such carrier materials. The titania can be added as a component of the initial mixture or it can be added to the porous calcined carrier by impregnation using a titanium salt that, for the purposes of this Application, is presumed to decompose to an oxide form during the firing operation.

After the components of the carrier are mixed together, for example by milling, the mixed material is formed, for example by extruding or pressing, into shaped pellets, for example, cylinders, rings, trilobes, tetralobes and the like. The formed material is dried to remove water that would convert to steam during calcination and destroy the physical integrity of the shapes. The drying and calcination can be combined in one step by suitable programming of the time and temperature. Calcining is carried out under conditions sufficient to volatilize lubricants, extrusion aids and binding agents and to fuse the alpha alumina particles into a porous, hard mass.

Calcination is typically carried out in an oxidizing atmosphere, such as oxygen gas or more preferably air and at a maximum temperature over 1300° C. and preferably ranging from about 1350° C. to about 1500° C. Times at these maximum temperatures can range from about 0.5 to about 200 minutes.

The calcined carriers typically have pore volumes (water) ranging from about 0.2 to about 0.6, and more preferably from about 0.3 to about 0.5 cc/g, and surface areas ranging from about 0.15 to about 3.0, and preferably from about 0.3 to about 2.0 m²/g.

As indicated above it may be necessary to add a ceramic bond material to the mixture to give added strength to the fired carrier. Conventional ceramic bond materials can be used in amounts of from about 0.2 to about 5% based on the weight of the ceramic components in the composition, and after firing these typically comprise components, (expressed as the oxides), such as silica, alumina, aluminosilicates, alkaline earth metal oxides, alkali metal oxides and minor trace amounts of iron oxide and titanium oxide, with the first two being the dominant components.

The preferred porous alpha alumina based carriers made by the process of the invention have a metallic leachables content below 2000 ppm and more preferably below about 1000 ppm. By comparison with carriers having similar porosities and packing densities made using the same ceramic components and with conventional burnout materials, they display a significantly greater selectivity stability in the oxidation of ethylene to ethylene oxide.

The carriers described above are particularly suited for preparing ethylene oxide catalysts which have high initial selectivities and long lives (enhanced stability).

DESCRIPTION OF PREFERRED EMBODIMENTS

The invention is further described with reference to the following Examples which are for the purposes of illustration only and are not intended to imply any necessary limitation on the essential scope of the invention.

EXAMPLE 1

This Example details the preparation of a carrier according to the invention which is compared with a prior art carrier made in exactly the same way from basically the same materials except for the use of an organic burnout material.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

Carrier Preparation

Two carriers identical except in respect of the use of burnout agent and the alumina source, were produced as follows:

An alpha alumina powder sold in the form of lightly sintered agglomerates was used in both cases. In the case of the product produced according to the prior art, that is with organic burn-out material, the original material, which comprises highly agglomerated particles with a volume average particle size, as measured using a laser light scattering device, of about 60 microns was subjected to a milling operation which reduced the agglomerates to the primary particles which had the properties given in Table 1 below.

For the product made according to the invention, the agglomerated particles were used without any previous milling operation in a 50/50 weight ratio with the milled particles described in Table 1.

TABLE 1

| Median Particle Size | 3.0–3.4 microns |
| Average Crystallite Size | 1.8–2.2 microns |
| Soda Content | 0.02–0.06% by wt. |

In both case the alumina component was used to prepare a formulation of the following ceramic components:

| Alpha Alumina | 98.8% |
|---|---|
| Zirconia | 1.0% |
| Magnesium silicate | 0.2% |

Based on the weight of this formulation, the following were added in the indicated proportions:

| Boric Acid | 0.1% |
|---|---|
| Extrusion Aids | 5.0% |

In the comparative example (PA-1) 25% of ground walnut shells were added as the burnout agent. No burnout agent was used for the carrier according to the invention, (I-1).

After the above had been mixed for 45 seconds, enough water was added to give an extrudable mixture, (about 30% in practice), and mixing was continued for a further 4 minutes. At this point 5% (based on the weight of the ceramic components), of vaseline was added and mixing was continued for a further 3 minutes. For the formulation resulting in carrier I-1, the above periods were changed to 30 seconds, 3 minutes and 2 minutes respectively.

This material was extruded in the form of 5/16×5/16 inch hollow cylinders and dried to less than 2% moisture. These were then fired in a tunnel kiln to a maximum temperature of 1390° C., (1385° C. for PA-1), for about 4 hours.

After processing in this manner the carriers had the following properties:

|  | I-1 | PA-1 |
|---|---|---|
| Water Absorption | 40.1% | 38.3% |
| C.S. | 19.1 lbs. | 28.9 lbs. |
| P.D. | 47.8 | 50.8 |
| Surface Area | 0.99 m²/gm. | 0.77 m²/gm. |

Leachable Cations (in nitric acid) in ppm:

|  |  |  |
|---|---|---|
| Na | 120 | 128 |
| K | 44 | 103 |
| Ca | 176 | 428 |
| Al | 418 | 660 |
| Total | 758 | 1319 |

The flat plate crush strength, (called here "C.S."), of the carrier is measured on a Compton Tensile Tester, model 50-OP) and the value given is in pounds.

"Water Absorption" is the percent increase in weight of the carrier after being immersed in water and re-weighed.

The settled packing density, ("Packing Density" or simply "P.D."), is measured by ASTM D-4699-87, modified by the use of cylinder with an inside diameter of ¾ inches and a length of 18 inches. The units are pounds/cubic foot.

The surface area, "S.A."), is the BET surface area measured using nitrogen or krypton as the adsorbate and is given in m²/gm.

Catalyst Preparation

The two carriers described above, (I-1 and PA-1), and the carriers used in Example 2, (I-2 and I-3 according to the Invention and PA-2 and PA-3 according to the prior art), were each used to prepare an ethylene oxide catalyst. In each case the general preparation method was as follows. To a solution of water and ethylenediamine were dissolved silver oxalate, cesium hydroxide, ammonium perrhenate, lithium sulfate and lithium nitrate in amounts sufficient to provide in the impregnated carrier (basis dry weight of carrier) target amounts of 13–14.5 wt % silver, 400–900 ppm cesium, 1.5–2.0 micromoles/g of ammonium perrhenate, 1.5–2.0 micromoles/g of lithium sulfate and 4–12 micromoles/g of lithium nitrate. Approximately 30 g of the carrier were placed under 25 mm vacuum for 3 minutes at room temperature. Approximately 50 g of the impregnating solution were then introduced to submerge the carrier, and the vacuum was maintained at 25 mm for an additional 3 minutes. At the end of this time, the vacuum was released, and the excess impregnating solution was removed from the carrier by centrifugation for 2 minutes at 500 rpm. The impregnated carrier was then cured by being continuously shaken in a 300 cu.ft./hr. air stream at 250°–260° C. for 5–6 minutes, (depending on the dryer used). The cured catalysts were designated C-I-1, C-I-2 and C-I-3, (according to the Invention), and C-PA-1, C-PA-2 and C-PA-3, (according to the prior art) and were then evaluated as described below.

The actual silver content of the catalyst can be determined by any of a number of standard, published procedures. The actual level of rhenium on the catalysts prepared by the above process can be determined by extraction with 20 mm aqueous sodium hydroxide solution, followed by spectrophotometric determination of the rhenium in the extract. The actual level of cesium on the catalyst can be determined by employing a stock cesium hydroxide solution, which has been labeled with a radioactive isotope to cesium, in catalyst preparation. The cesium content of the catalyst can then be determined by measuring the radioactivity of the catalyst. Alternatively, the cesium content of the catalyst can be determined by leaching the catalyst with boiling deionized water. In this extraction process cesium, as will as the other alkali metals, is measured by extraction from the catalyst by boiling 10 grams of whole catalyst in 20 milliliters of water for 5 minutes, repeating the above two more times, combining the above extractions and determining the amount of alkali metal present by comparison to standard solutions of reference alkali metals using atomic absorption spectroscopy (using Varian Techtron Model 1200 or equivalent). It should be noted that the cesium content of the catalyst as determined by the water leaching technique may be lower than the cesium content of the catalyst as determined by the radiotracer technique.

The catalyst contents were as shown in Table 2

TABLE 2

| CARRIER | I-1 | PA-1 | I-2 | PA-2 | I-3 | PA-3 |
|---|---|---|---|---|---|---|
| Re | 1.8 | 1.5 | 1.5 | 1.5 | 2.0 | 2.0 |
| Li* | 1.8 | 1.5 | 1.5 | 1.5 | 2.0 | 2.0 |
| Li** | 12 | 12 | 12 | 12 | 4 | 4 |
| Cs actual | 738 | 645 | 727 | 444 | 828 | 599 |
| Ag wt % | 13.2 | 13.2 | 13.2 | 13.2 | 14.5 | 14.5 |

Re is added as ammonium perrhenate, Li* is added as lithium sulfate and Li** is added as lithium nitrate. In each case the amount given is a target amount expressed in μmoles/gm. The silver is also given as a target amount and in the case of PA-2 the actual amount was found to be 13.4 wt %.

With the exception of I-1 the carrier/catalyst was dried at 250° C. for five minutes. I-1 was given six minutes at the same temperature.

The Process

The following describes the standard microreactor catalyst test conditions and procedures used to test the C-I-1 and C-PA-1 catalysts for the production of ethylene oxide from ethylene and oxygen.

Three to five grams of crushed catalyst (14–20 mesh) are loaded into a 0.21 inch inside diameter stainless steel U-shaped tube. The U tube is immersed in a molten metal bath (heat medium) and the ends are connected to a gas flow system. The weight of catalyst used and the inlet gas flow rate are adjusted to achieve a gas hourly space velocity of 3300 cc of gas per cc of catalyst per hour. The inlet gas pressure is 210 psig.

The gas mixture passed through the catalyst bed (in once-through operation) during the entire test run (including startup) consists of 30% ethylene, 8.5% oxygen, 5% carbon dioxide, 54.5% nitrogen, and 0.5 to 6 ppmv ethyl chloride as a moderator. The moderator level is adjusted throughout the testing period to maintain optimal selectivity.

Prior to being contacted with the reactant gases, the catalysts are typically pretreated with nitrogen gas at 225° C. for 3 hours. The initial reactor (heat medium) temperature is 225° C. After one hour at the initial temperature, the temperature is increased to 235° C. for one hour, followed by 245° C. for one hour. The temperature is then adjusted so as to achieve a constant oxygen conversion level of 40% ($T_{40}$). The moderator level is varied and run for 4–24 hours at each level to determine the optimum moderator level for maximum selectivity. Due to slight differences in feed gas composition, gas flow rates, and the calibration of analytical instruments used to determine the feed and product gas compositions, the measured selectivity and activity of a given catalyst may vary slightly from one test run to the next.

To allow meaningful comparison of the performance of catalysts tested at different times, the catalysts described in this illustrative embodiment were tested simultaneously, (i.e. in parallel), with a standard reference catalyst. All performance data reported in this illustrative embodiment are corrected to conform to the average initial performance of the reference catalyst which was $S_{40}$=81.0% and $T_{40}$=230° C.

Measurements were taken continuously and are reported below at 150, 200 and 250 days to give an indication of the stability of the selectivity over time. The results are given in Table 3 below.

TABLE 3

| Catalyst | $S_{40}$ % | | | $T_{40}$ °C. | | |
|---|---|---|---|---|---|---|
| Days | 150 | 200 | 250 | 150 | 200 | 250 |
| C-I-1 | 84.8 | 83.8 | 83.0 | 269 | 277 | 279 |
| C-PA-1 | 84.8 | 82.6 | 81.5 | 277 | 281 | 284 |

As can be seen from the above comparison, the catalyst deposited on a carrier according to the invention maintains its selectivity for significantly longer than the catalyst deposited on a prior art carrier.

EXAMPLE 2

Additional carriers according to the invention were produced along with comparison materials differing only in the use of organic burnout materials. The aluminas were supplied in exactly the same way as described in Example 1 with the exception that the lightly sintered agglomerates, which in this case were quite friable, were used without admixture of the milled agglomerate powders to produce the I-2 and I-3 carriers. The mixing and extruding processes were found to be quite adequate to partially comminute the agglomerates and produce a balance of coarse and fine particles giving a porosity in the desired range.

The carriers were produced and tested exactly as were those described in Example 1 above with the differences noted below.

| Carrier Formation, Compositions and Properties | | | | |
|---|---|---|---|---|
| | I-2 | PA-2 | I-3 | PA-3 |
| Alumina | | | | |
| Med.Part.Size | 60µ* | 3.0–3.4µ | 62µ* | 3.0–4.0µ |
| Cryst. Size | 1.6–2.2µ | 1.6–2.2µ | 1.0–1.4µ | 1.0–1.4µ |
| Soda (% by wt) | .02–.06 | .02–.06 | .02–.06 | .02–.06 |
| Composition (%) | | | | |
| Alumina | 98.8 | 98.8 | 98.85 | 98.7 |
| Zirconia | 1.0 | 1.0 | 1.0 | 1.0 |
| $CaSiO_3$ | 0.2 | 0.2 | 0.15 | 0.3 |
| Burnout** | 0 | 25.0 | 0 | 25.0 |
| Boric Acid | 0.1 | 0.1 | 0.1 | 0.1 |
| Extrusion Aid*** | 5.0 | 5.0 | 5.0 | 5.0 |

*as fed to mixing process
**walnut shells
***vaseline

| Properties | I-2 | PA-2 | I-3 | PA-3 |
|---|---|---|---|---|
| Pack.Dens. (#/ft³) | 46.1 | 49.8 | 46.1 | 44.0 |
| Crush Strength (#) | 7.0 | 21.1 | 11.8 | 14.3 |
| Surf. Area (m²/gm) | 0.92 | 0.51 | 0.99 | 0.66 |
| Water Absorp (%) | 43.1 | 38.3 | 42.4 | 49.5 |
| Leachable cations: | | | | |
| Na | 71 | 188 | 64 | 48 |
| K | 28 | 66 | 32 | 30 |
| Ca | 700 | 790 | 484 | 1298 |
| Al | 558 | 486 | 348 | 510 |
| Total | 1357 | 1530 | 928 | 1886 |
| Firing Temp. | 1390°C. | 1390°C. | 1393°C. | 1413°C. |

The above carriers were then evaluated after having been provided with a catalyst in the manner described in Example 1 to give pairs of catalysts identified as C-I-2/C-PA-2, and C-I-3/C-PA-3.

For C-I-2 and C-PA-2 an accelerated aging test was used. Testing conditions were the same as those given for C-I-1 and C-PA-1, with the following differences: after obtaining initial performance values for selectivity and activity at 40% oxygen conversion, the catalysts were brought to 85% oxygen conversion or to a maximum temperature of 285° C. for a 10 day period to accelerate the aging of the catalyst. After this 10 day aging period the oxygen conversion is reduced back to 40% and the performance is re-optimized, (using the ethyl chloride moderator), under standard conditions. This cycle is then repeated so that the selectivity and activity decline of the catalyst is measured under the standard 40% oxygen conversion conditions after each 10 day period at 85% oxygen conversion or a maximum temperature of 285° C. Table 4 shows the performance at 40% oxygen conversion after aging for the number of days indicated at 85% oxygen conversion or a maximum temperature of 285° C.

TABLE 4

|                              | C-I-2 | C-PA-2 |
|------------------------------|-------|--------|
| $S_{40}$ % after days indicated |       |        |
| 20                           | 86.7  | 83.8   |
| 40                           | 85.9  | 82.4   |
| 60                           | 83.7  | 80.5   |
| 80                           | 83    | 77.8   |
| $T_{40}$ °C. after days indicated |   |        |
| 20                           | 260   | 259    |
| 40                           | 268   | 265    |
| 60                           | 275   | 267    |
| 80                           | 280   | 275    |

For C-I-3 and C-PA-3 a higher severity accelerated aging test was used. Crushed catalyst, (0.7–0.8 gm of 40–80 mesh particles), were loaded into a 3.8 mm (inside diameter) stainless steel U-shaped tube. The weight of the catalyst and the gas flow were adjusted to achieve a gas hourly space velocity of 16,500 cc of gas per cc of the catalyst per hour. The outlet gas pressure was 210 psig. Prior to being contacted with the reactant gases, the catalysts were treated with nitrogen gas at 225° C. for 24 hours. The gas mixture passed through the catalyst bed consisted of 30% ethylene, 8.5% oxygen, 7% carbon dioxide and 54.5% nitrogen. It also contained 4 ppmv of ethyl chloride, and 4 ppmv vinyl chloride as moderators. The initial reactor (heat medium) temperature was 225° C. After one hour at the initial temperature, the temperature was raised to 235° C. for one hour followed by 245° C. for one hour. The temperature was then adjusted so as to achieve a constant oxygen conversion level of 40%, ($T_{40}$). The selectivity and activity loss relative to the initial performance as a function of days on stream are given in Table 5 below.

TABLE 5

|                                         | C-I-3 | C-PA-3 |
|-----------------------------------------|-------|--------|
| Selectivity loss $\Delta S_{40}$ after indicated days |   |        |
| 10                                      | 2.2   | 1.75   |
| 20                                      | 2.2   | 3.5    |
| 30                                      | 3.5   | 8.5    |
| 40                                      | 5.2   | 9.0    |
| $\Delta T_{40}$ °C. after days indicated |      |        |
| 10                                      | 18    | 15     |
| 20                                      | 21    | 25     |
| 30                                      | 31    | 38     |
| 40                                      | 34    | 41     |

It will be appreciated that the catalysts deposited on the carriers according to the invention retain their performance rather better under the conditions of the accelerated testing that the prior art products.

What is claimed is:

1. A process for the production of a catalyst carrier which comprises:
   a) providing a mixture consisting essentially of:
      i) ceramic components comprising at least 80% by weight of alpha alumina, from 0.01 to about 10% by weight (measured as the oxide, MO,) of an alkaline earth metal oxide, from 0.01 to about 10% by weight (measured as silica) of a silicon oxide, and from zero to about 15% by weight (measured as the dioxide) of zirconium in the form of an oxide;
      ii) a liquid carrier medium in an amount to render the mixture shapable; and
      iii) a total amount from zero to 15% by weight based on the ceramic components of ceramic bond, lubricant and/or forming aids;
   b) shaping the mixture to form a carrier precursor;
   c) drying the carrier precursor to remove the liquid carrier medium; and then
   d) firing the precursor to form a carrier with an essentially uniform porosity of from about 15 to about 60%, wherein the particle sizes of the ceramic components are chosen such that the packing density of the dried precursor is not greater than that of the fired carrier.

2. A process according to claim 1 in which the ceramic components of the mixture comprise at least 85 percent by weight of alpha alumina, from about 0.01 to about 6.0% by weight of an alkaline earth metal silicate selected from the group consisting of calcium and magnesium silicates and from about 0.01 to about 10 percent by weight of zirconia.

3. A process according to claim 1 in which the alpha alumina component has a bimodal particle size distribution with a first mode having an average particle size of from 15 to 120 microns and a second mode having an average particle size that is less than half that of the first mode and is between about 1 and 15 microns.

4. A process according to claim 1 in which the alpha alumina component selected comprises lightly sintered agglomerates with a median particle size of from about 15 to 120 microns.

5. A process according to claim 4 in which the alpha alumina component selected comprises lightly sintered agglomerates with a median particle size of from about 30 to 90 microns.

6. A process according to claim 1 in which the ceramic components further comprise a compound that forms titania when the carrier is fired in an amount sufficient to provide the equivalent of from about 0.01 to about 5% by weight of titania.

7. A process for the production of a catalyst carrier which comprises:
   a) providing a mixture consisting essentially of:
      i) ceramic components comprising at least 90% by weight of alpha alumina, from 0.01 to about 10.0% by weight (measured as the oxide, MO,) of an alkaline earth metal oxide, from 0.01 to about 10.0% by weight (measured as silica) of a silicon oxide, and from zero to about 10% by weight (measured as the dioxide) of zirconium in the form of an oxide;
      ii) a liquid carrier medium in an amount to render the mixture shapable; and
      iii) a total of from zero to 10% by weight based on the ceramic components of ceramic bond, lubricant and/or forming aids;
   b) shaping the mixture to form a carrier precursor;
   c) drying the carrier precursor to remove the liquid carrier medium; and then
   d) firing the precursor to form a carrier with an essentially uniform porosity of from about 15 to about 60%, wherein the loss in weight upon firing the dried precursor is less than 15%.

8. A process according to claim 7 in which the ceramic components of the mixture comprise at least 85 percent by weight of alpha alumina, from about 0.01 to about 6.0% by weight of an alkaline earth metal silicate selected from the group consisting of calcium and magnesium silicates and from about 0.01 to about 10 percent by weight of zirconia.

9. A process according to claim 7 in which the alpha alumina component has a bimodal particle size distribution with a first mode having an average particle size of from 15 to 120 microns and a second mode having an average particle size that is less than half that of the first mode and is between about 1 and 15 microns.

10. A process according to claim 7 in which the alpha alumina component selected comprises lightly sintered agglomerates with a median particle size of from about 15 to 120 microns.

11. A process according to claim 10 in which the alpha alumina component selected comprises lightly sintered agglomerates with a median particle size of from about 30 to 90 microns.

12. A process according to claim 7 in which the ceramic components further comprise a compound that forms titania when the carrier is fired in an amount sufficient to provide from about 0.01 to about 5% by weight of titania.

* * * * *